Aug. 16, 1960  H. S. VAN BUREN, JR  2,949,141
NUT WITH A WASHER SECURED THERETO BY SEPARABLE MEANS
Filed Oct. 18, 1956
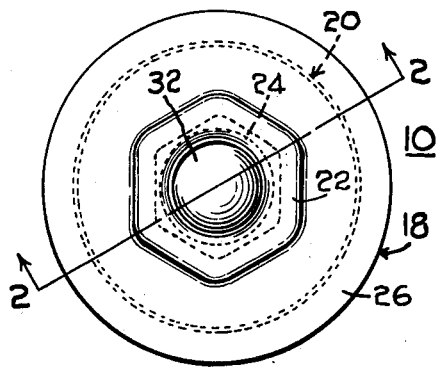
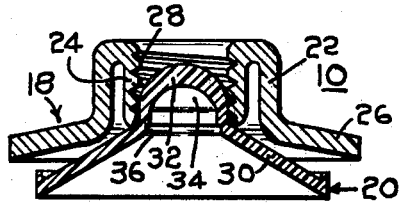
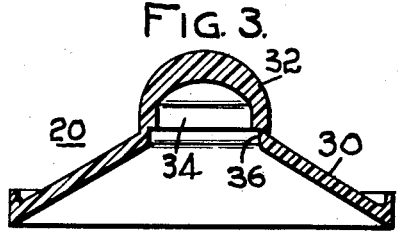
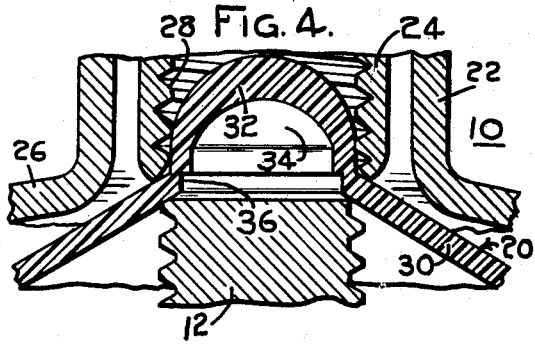
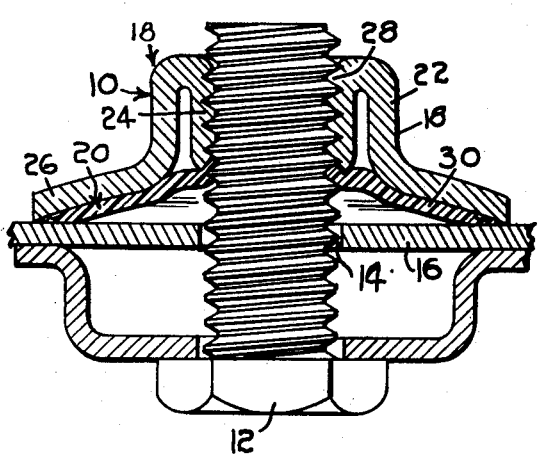
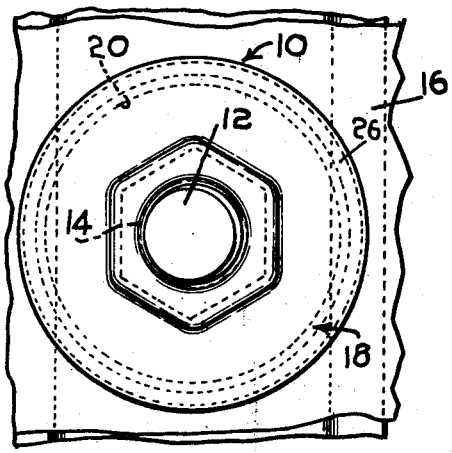
INVENTOR:
HAROLD S. VAN BUREN JR.,
BY Robert E Ross
ATTORNEY.

United States Patent Office 2,949,141
Patented Aug. 16, 1960

2,949,141

NUT WITH A WASHER SECURED THERETO BY SEPARABLE MEANS

Harold S. Van Buren, Jr., Cambridge, Mass., assignor to United-Carr Fastener Corporation, Boston, Mass., a corporation of Delaware Filed Oct. 18, 1956, Ser. No. 616,733

1 Claim. (Cl. 151—38)

This invention relates generally to fastening devices, and has particular reference to a sealing nut assembly which is adapted to receive a bolt in watertight engagement.

In the construction of automobiles, household appliances, and the like, it is frequently desired to attach a trim molding, a name plate, or the like to a sheet metal panel, and in many cases it is desirable that such attachment be waterproof to prevent the entrance of moisture and dust to the interior of the device.

Although a number of methods have been proposed to provide a waterproof seal in such an assembly, none have proved entirely satisfactory. Most of the devices in use utilize a mastic sealing compound in the nut. However, it has been found that such devices do not provide an absolutely watertight seal about the threads of the bolt, are difficult to handle, and are expensive to manufacture.

The object of this invention is to provide a sealing nut device in which the sealing portion is adapted for rapid and economical assembly in automatic machinery.

A further object of the invention is to provide a sealing nut assembly in which means is provided to grip tightly about the threads of an inserted bolt and to squeeze between the bolt and the nut to provide a watertight seal therebetween.

A further object of the invention is to provide a sealing nut assembly in which the sealing member also provides a friction lock when the nut is assembled onto a bolt.

Other objects of the invention will be obvious to one skilled in the art from the following description of a specific embodiment thereof.

In the drawing:

Fig. 1 is a top plan view of a sealing nut assembly embodying the features of the invention;

Fig. 2 is a view in section taken on line 2—2 of Fig. 1;

Fig. 3 is a view of the sealing member prior to assembly with the nut;

Fig. 4 is an enlarged view of a portion of Fig. 2;

Fig. 5 is a view in section of an assembly utilizing the nut of Figs. 1–3; and

Fig. 6 is a top plan view of the assembly of Fig. 5.

Referring to the drawing, there is illustrated a sealing nut assembly 10, which is adapted to engage a bolt 12 protruding through an opening 14 in a supporting panel 16, and provide a watertight seal about the bolt.

The nut assembly 10 comprises generally a nut 18 and a sealing member 20 assembled therewith. The nut 18 comprises an outer barrel 22 shaped to receive a wrench, an inner barrel 24 joined to the outer barrel at one end, and an outwardly and downwardly extending flange 26 disposed on the other end of the outer barrel. The inner barrel 24 has a central aperture 28 threaded to receive the bolt 12.

The sealing member 20 is formed of a single piece of resilient deformable material, such as synthetic organic plastic, for example, polyethylene, and comprises a flange portion 30 which is generally conical, and a retaining portion 32 extending upwardly from the center of the conical portion. The retaining portion 32 has a central aperture 34, forming a relatively thin peripheral wall 36. Prior to assembly with the nut, the retaining portion 32 has a diameter greater than that of the threaded aperture 28 so that when assembled, the retained portion is gripped tightly therein.

When the nut assembly is inserted onto the bolt, the end of the bolt mashes into the plastic of the peripheral wall, cutting off the upper end of the retaining portion. Since the aperture in the retaining portion is smaller than the bolt, the bolt is gripped tightly by the surrounding material of the sealing member, and a portion of the material in the peripheral wall 36 is forced into the space between the threads of the bolt and the nut. In the usual case, it has been found that at least two full turns of the threads have the material of the peripheral wall disposed therebetween, thereby providing a watertight seal about the bolt and providing a friction lock between the nut and bolt. As the nut is tightened onto the bolt, the flange of the nut forces the flange of the sealing member tightly against the panel, thereby insuring a watertight seal about the periphery of the assembly, and providing a further resilient friction lock between the nut and the panel.

The nut assembly illustrated herein has been found to provide an absolutely watertight seal about a bolt onto which it is assembled, and is economical to manufacture, since the sealing device is readily adapted for assembly into the nut in automatic machines. The assembly is also easily handled without the danger of the parts striking together as is frequently the case with parts which utilize a mastic compound as the sealing agent.

Since certain obvious changes may be made in the device without departing from the scope of the invention, it is intended that all matter contained herein be interpreted in an illustrative and not in a limiting sense.

I claim:

A sealing nut device for assembly onto a threaded member extending through a panel opening comprising a pre-assembled sheet metal nut and a thread sealing member forming a two-piece assembly, said nut having an outer barrel portion, an inner barrel portion disposed within said outer barrel portion in spaced, substantially parallel relationship therewith, said inner and outer barrel portions being united at one end thereof, the inner surface of said inner barrel portion being threaded forming an axial extending threaded central bore in the nut for receiving a threaded bolt therein, and an outwardly and downwardly extending deformable flange portion joined to the opposite end of said outer barrel portion and lying below the free end of said inner barrel portion; said resilient sealing member, prior to assembly of the nut to a bolt, having a generally conical shaped flange portion generally conforming to the contour of said deformable flange portion of said nut, and a retaining portion having a diameter greater than that of said inner barrel portion and extending upwardly from the center of said flange portion for frictionally engaging threads of the inner barrel portion of said nut adjacent the lower free end thereof to provide the only means for holding the nut and sealing member in mechanical assembly, said retaining portion having a central aperture forming a relatively thin peripheral wall of a diameter less than that of the bolt to be inserted at the jointure point of said conical flange portion and said retaining member whereby upon assembly of the nut device on a bolt, the end of the bolt engages the peripheral wall thereby shearing, upon tightening of the bolt, of the upper end of the retaining portion and forcing a portion of the peripheral wall in the space between the threads of the bolt and nut.

References Cited in the file of this patent

UNITED STATES PATENTS

| | | |
|---|---|---|
| 1,157,574 | Mueller | Oct. 19, 1915 |
| 2,287,691 | Marchou | June 23, 1942 |
| 2,761,349 | Heller | Sept. 4, 1956 |
| 2,775,917 | Ferguson | Jan. 1, 1957 |
| 2,826,435 | Schustack | Mar. 11, 1958 |

FOREIGN PATENTS

| | | |
|---|---|---|
| 982,539 | France | Jan. 31, 1951 |